United States Patent [19]
Yoshino

[11] Patent Number: 5,196,843
[45] Date of Patent: Mar. 23, 1993

[54] DATA COMMUNICATION APPARATUS WITH MULTI-ADDRESS CALLING

[75] Inventor: Motoaki Yoshino, Kawasaki, Japan

[73] Assignee: Canon Kabushiki Kaisha, Tokyo, Japan

[21] Appl. No.: 752,979

[22] Filed: Sep. 3, 1991

Related U.S. Application Data

[63] Continuation of Ser. No. 442,721, Nov. 29, 1989, abandoned.

[30] Foreign Application Priority Data

Nov. 29, 1988 [JP] Japan ................................ 63-299541

[51] Int. Cl.$^5$ ............................................. H04Q 1/00
[52] U.S. Cl. ................................ 340/825.52; 358/407
[58] Field of Search ................ 340/825.52, 825.44; 379/216, 355, 356, 100, 94; 358/407, 440, 444, 434

[56] References Cited

U.S. PATENT DOCUMENTS

| | | | |
|---|---|---|---|
| 4,532,379 | 7/1985 | Tsukioka | 379/355 |
| 4,607,289 | 8/1986 | Kurokawa | 358/440 |
| 4,646,160 | 2/1987 | Iizuka et al. | 379/355 |
| 4,722,955 | 9/1988 | Kurahayashi | 358/434 |
| 4,748,662 | 5/1988 | Hirata | 379/356 |
| 4,785,355 | 11/1988 | Matsumoto | 358/434 |
| 4,845,569 | 7/1989 | Kurahayashi et al. | 358/434 |

FOREIGN PATENT DOCUMENTS 0096945  5/1985  Japan .................................. 358/407

*Primary Examiner*—Donald J. Yusko
*Assistant Examiner*—Edwin C. Holloway, III
*Attorney, Agent, or Firm*—Fitzpatrick, Cella, Harper & Scinto

[57] ABSTRACT

A data communication apparatus includes a receiving unit for receiving data, a memory for prestoring data of multi-address called stations, a sending unit for sending the data received by the receiving unit in a multi-address calling mode, a unit for receiving an instruction signal for instructing multi-address calling from a relay request station, and a control unit for causing the sending unit to perform multi-address calling to the multi-address called stations stored in the memory in response to reception of the relay instruction signal. The control unit checks whether or not a multi-address called station stored in the memory is the relay request station, and inhibits multi-address calling to the relay request station in accordance with the checking result.

8 Claims, 4 Drawing Sheets

FIG. 2A

RELAY REQUEST STATION DIAL NUMBERS

| f 01 | |
|---|---|
| 02 | 0 3 7 5 7 6 2 9 0 |
| 03 | |
| 04 | |
| 05 | |
| 06 | |
| 07 | |
| 08 | |
| 09 | |
| 10 | |

MULTI-ADDRESS CALLED STATION DIAL NUMBERS

| g 01 | |
|---|---|
| 02 | |
| 03 | |
| 04 | |
| 05 | 0 3 7 5 7 6 2 9 0 |
| 06 | |
| 94 | |
| 95 | |
| 96 | |
| 97 | |
| 98 | |
| 99 | |

30

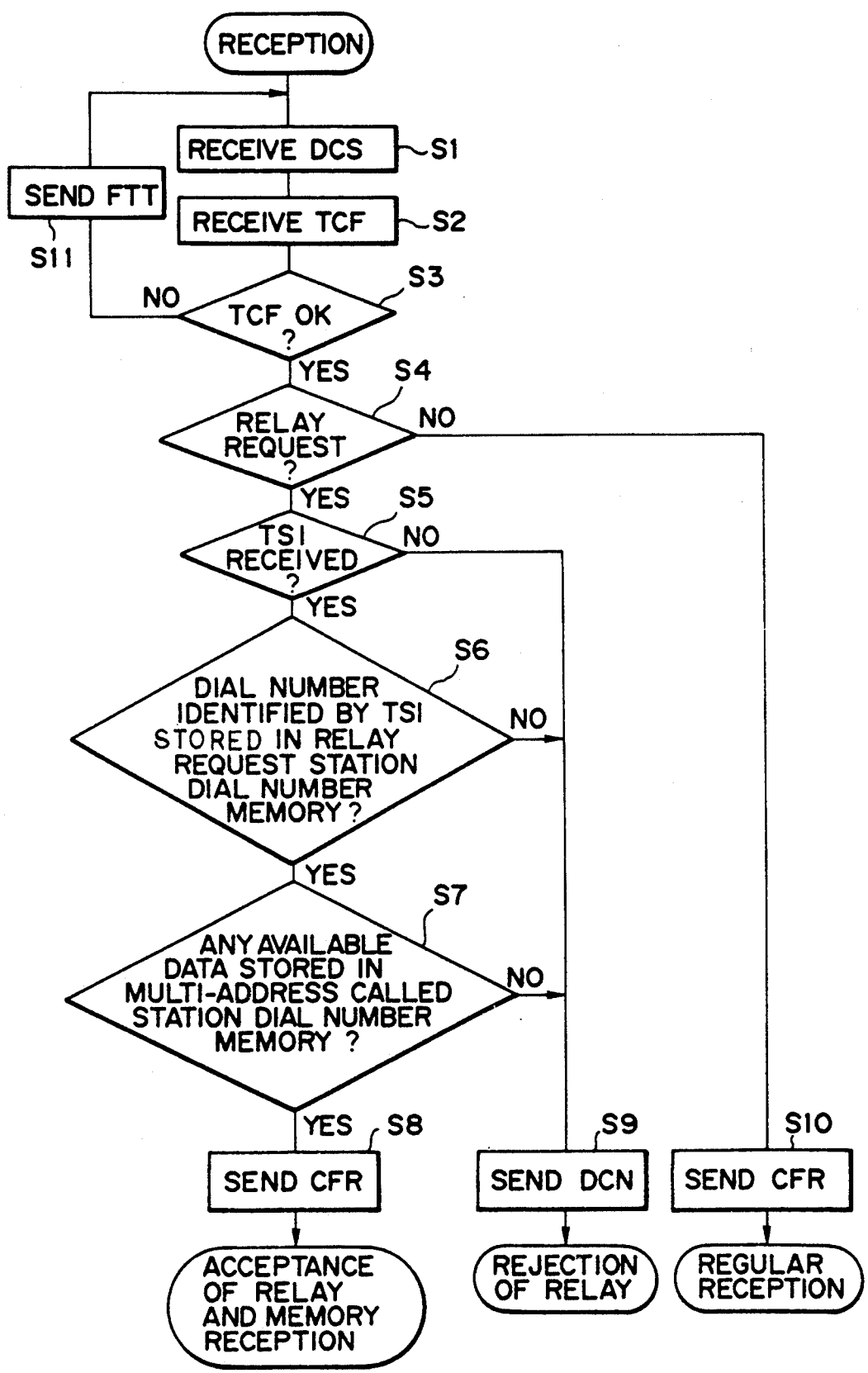

DATA COMMUNICATION APPARATUS WITH MULTI-ADDRESS CALLING

This application is a continuation of application Ser. No. 07/442,721 filed Nov. 29, 1989, now abandoned.

BACKGROUND OF THE INVENTION

1. Field of the Invention

The present invention relates to a data communication apparatus and, more particularly, to a data communication apparatus which relays and sends data sent from a relay request station to prestored multi-address called stations in a multi-address calling mode on the basis of a relay request from the relay request station.

2. Related Background Art

In a conventional data communication apparatus such as a facsimile apparatus, a multi-address calling function for sending the same image data to a plurality of called stations is known. In addition, a relay multi-address calling system as a combination of the multi-address calling function and a relay function is also known. In this system, a relay station which received an instruction from a request station performs multi-address calling to multi-address called stations registered in advance. U.S. Pat. No. 4,785,355 and U.S. Pat. No. 4,974,097 which is a continuation of U.S. patent application Ser. No. 120,104 filed on Nov. 13, 1987, now abandoned, are known as applications associated with relay multi-address calling, and U.S. Pat. Nos. 4,772,955 and 4,845,569, and U.S. patent application Ser. No. 387,981 filed on Aug. 1, 1989, which is allowed, are known as applications associated with multi-address calling.

In the conventional relay multi-address calling system, data is unconditionally sent to all the registered multi-address called stations. For this reason, if a relay request station is registered as a multi-address called station in a relay station, since data is sent to all the registered multi-address called stations, data is unnecessarily sent to a relay request station as a source station.

SUMMARY OF THE INVENTION

It is an object of the present invention to improve a data communication apparatus in consideration of the conventional problems.

It is another object of the present invention to inhibit multi-address calling to a relay request station when the relay request station is included in prestored multi-address called stations.

It is still another object of the present invention to inhibit relay multi-address calling to a given multi-address called station when identification data of a relay request station is compared with that of the given multi-address called station and a coincidence between the two data is found.

The above and other objects will be apparent from the following description of the embodiment taken in conjunction with the accompanying drawings.

BRIEF DESCRIPTION OF THE DRAWINGS

FIG. 2A shows a format of a relay request station dial number memory;

FIG. 2B shows a format of a multi-address called station dial number memory;

FIG. 3 is a flow chart showing a reception operation of a relay station; and

DETAILED DESCRIPTION OF THE PREFERRED EMBODIMENT

An embodiment of the present invention will be described hereinafter with reference to the accompanying drawings. In this embodiment, a facsimile apparatus will be exemplified. However, the present invention is not limited to the facsimile apparatus but may be applied to all other data communication apparatuses such as telex, personal computer communication, and the like as long as they have a relay multi-address calling function.

Figure 1:
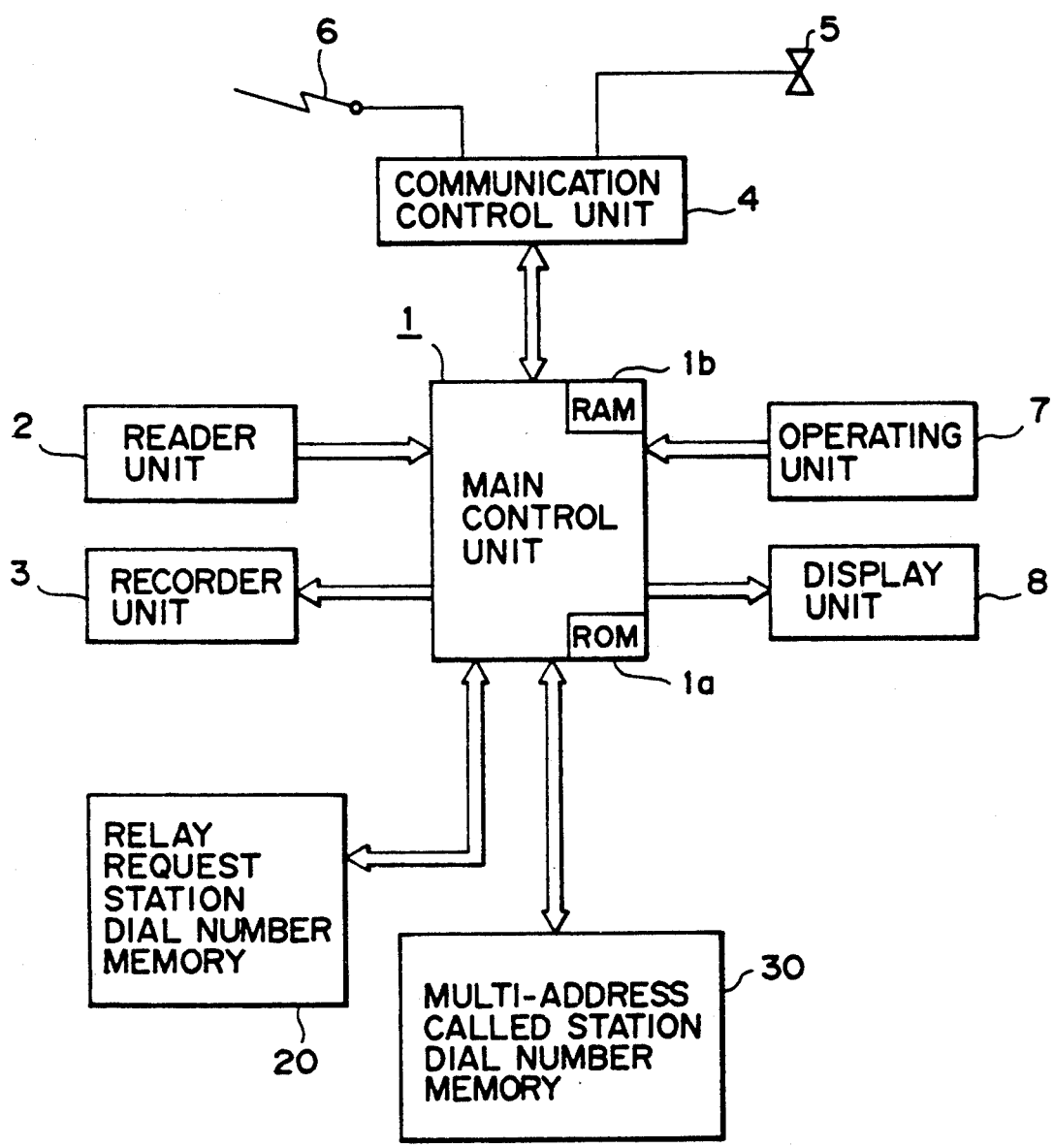
FIG. 1 is a block diagram showing an arrangement of a facsimile apparatus according to an embodiment of the present invention.

FIG. 1 is a block diagram showing a basic arrangement of a facsimile apparatus operated as a relay station of this embodiment.

In FIG. 1, a main control unit 1 for controlling the operation of the overall apparatus comprises a microprocessor, a ROM (program memory) 1a, a RAM 1b for a work area, and the like. The main control unit 1 is connected to the following circuits, and controls these circuits in accordance with a program to be described later. The RAM 1b is used as an image memory for storing image data to be transmitted or received or to be subjected to multi-address calling in addition to a work area.

The main control unit 1 is connected to a reader unit 2 which comprises a CCD image sensor, an original conveying mechanism, and the like, and a recorder unit 3 which comprises a thermal printer or a laser printer.

The main control unit 1 is also connected to a communication control unit 4 which comprises a modem, an NCU (network control unit), a calling signal detector, a dialing circuit, and the like, a telephone set 5, a communication line 6 (in this embodiment, a telephone line), an operating unit 7 comprising a keyboard and the like, and a display unit 8 comprising an LCD, LED, and the like. The communication control unit 4 has at least a known automatic calling/terminating function, and a function of outputting a corresponding dial signal onto the line 6 on the basis of dial number data input from the main control unit 1.

In this embodiment, the main control unit 1 is connected to a relay request station dial number memory 20. The memory 20 comprises a programmable memory such as a RAM, an EEPROM, or the like, and can store dial numbers of source stations which may issue a relay request up to a maximum of 10 stations. The storage format of the request station dial number memory 20 is constituted by fields f01 to f10 having a number of bytes great enough to register ten to several ten figures of dial number data, as shown in FIG. 2A.

In this embodiment, a dial number registered in the request station dial number memory 20 identifies a station which can issue a relay request to the apparatus of this embodiment, and it is used to inhibit unnecessary calling to the station when the station issues a relay request and is included in the called stations to be relayed.

Another memory 30 connected to the main control unit 1 can register dial numbers of called stations to be relayed and sent to according to a relay request up to a maximum of 99 stations (however, the number of registered numbers is not limited to 99). The multi-address called station dial number memory 30 is constituted of fields g01 to g99 having a number of bytes great enough to register ten to several ten figures of dial number data, as shown in FIG. 2B, as in the request station dial number memory 20.

Dial number data stored in the request station dial number memory 20 and the multi-address called station dial number memory 30 are input from the operating unit 7 through a predetermined registration operation.

Figure 4:
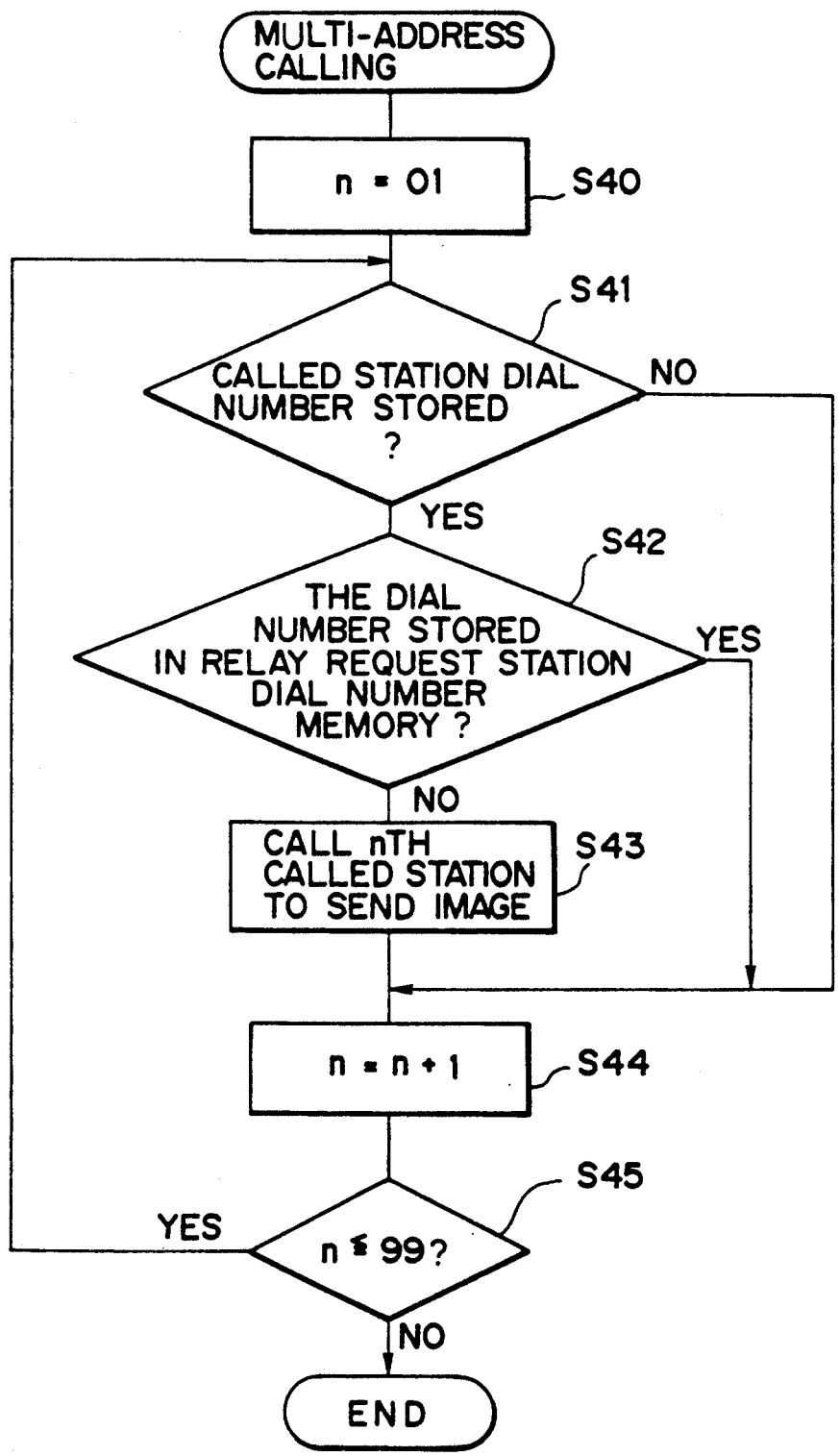
FIG. 4 is a chart showing a multi-address calling operation of an image to be relayed.

An operation of the above arrangement will be described below with reference to FIGS. 3 and 4. FIGS. 3 and 4 respectively show flows of a multi-address calling control program executed by the main control unit 1, and procedures shown in FIGS. 3 and 4 are stored in the ROM 1a as micro codes.

When image data is to be received, a communication pre-procedure in steps S1 to S3 and step S11 in FIG. 3 is performed upon detection of a calling signal by the communication control unit 4 or upon manual operation at the operating unit 7.

More specifically, in step S1, a DCS (digital command signal) linked with an NSS (non-standard facilities set-up signal), a TSI (transmitting subscriber identification), and the like is received. In step S2, training and TCF (training check) signals are received. These procedure signals are received through the communication control unit 4.

In step S3, the reception result of the TCF signal is checked. If NO in step S3, an FTT (failure to train) signal is sent in step S11, and the flow returns to step S1.

However, if YES in step S3, an operation mode is determined in accordance with the content of the received (NSS, TSI) DCS signals in steps S4 to S10. A relay request is assumed to be issued using a predetermined facsimile information field in the NSS signal like in a conventional apparatus.

In step S4, the presence/absence of a relay request is checked. More specifically, when no NSS signal is received and when no relay request is included in the NSS signal, the flow advances to step S10, and a CFR signal is sent to start regular reception. However, when a relay request is included in the NSS signal, the flow advances to step S5.

It is checked in step S5 if the TSI signal is received. If NO in step S5, since a dial number of a transmitting station is unknown if no TSI data is received, a DCN (disconnect) signal is sent in step S9 to reject a relay request.

However, if YES in step S5, the propriety of a request station is checked in steps S6 and S7. It is first checked whether or not a dial number of a transmitting station (relay request station) identified by the TSI signal is registered in the request station dial number memory 20. If NO in step S6, since the station of interest has no right to a relay request, a relay request is rejected, and the DCN signal is sent in step S9 to disconnect a line.

Note that collation of the dial number is performed by collating dial number data in the TSI signal and dial number data in each field fn in the request station dial number memory 20. In this case, collation is performed by only numerical value portions excluding a collation data space. In practice, all the digits of a dial number need not always be collated. Collation can be satisfactorily performed using only the lower six digits.

If it is determined in step S6 that the same dial number as that in the TSI signal is registered, the flow advances to step S7 to check if at least one available data is registered in the multi-address called station dial number memory 30. If NO in step S7, a relay request is rejected, and the DCN signal is sent in step S9 to disconnect a line. However, if YES in step S7, the dial number of a relay request station is stored in the work area of the RAM 1b in the main control unit 1. In step S8, a CFR (confirmation to receive) signal is sent to accept a relay request, and data is stored in an image memory in the RAM 1b.

When the relay request is accepted in the above procedure, relay multi-address calling is performed according to a procedure shown in FIG. 4. In this process, image data to be relayed is stored in the RAM 1b, the dial number of the request station is stored in the RAM 1b, and dial numbers of called stations to be subjected to multi-address calling are stored in the multi-address called station dial number memory 30.

In step S40, the content of a counter N for counting the number of multi-address called stations and for controlling the multi-address called stations is set to n=1 to prepare for starting multi-address calling.

Data in the field gn of the multi-address called station dial number memory 30 is referred to in accordance with the content of the counter N. If no data is registered in the field gn, the flow advances to step S44 to increment the content of the counter N to n=n+1. If data is registered in the field gn of the multi-address called station dial number memory 30, the registered data is read out, and is collated with the relay request station dial number stored in the RAM 1b in step S42. If YES in step S42, i.e., a coincidence between the two numbers is found, the flow advances to step S44 without sending data to the corresponding station.

If NO in step S42, the flow advances to step S43 to call the corresponding station on the basis of the data read out from the multi-address called station dial number memory 30 so as to send a relay request image stored in the RAM 1b. Upon completion of transmission, the flow advances to step S44 to increment the count n of the counter N to n=n+1. In step S45, it is checked if the count n exceeds a maximum value (in this embodiment, 99), thereby checking whether or not multi-address calling processing is performed up to the final called station. If NO in step S45, the flow returns to step S41 to continue the multi-address calling operation.

According to this embodiment, called stations having the right to issue a relay request are stored in the request station dial number memory 20, and a relay request is accepted from only the stored called stations. During relay calling, if called stations to be subjected to relay multi-address calling include the relay request station of the image data, multi-address calling to the relay request station is inhibited. Therefore, image transmission to a transmission source station can be inhibited, and waste of communication cost and processing time can be prevented.

In the above embodiment, there is only one group of relay multi-address called stations, and multi-address calling is performed to the same called stations in response to a request from any relay request station. However, if a plurality of multi-address called station groups are formed, and data for assigning each relay request station to one of the multi-address called station groups is added, a high-grade relay multi-address calling system is realized. In this case, the request station dial number memory 20 and the multi-address called station dial number memory 30 store ID data indicating a group in addition to dial numbers, and called stations to be subjected to relay calling are selected on the basis of the ID data.

In the above embodiment, dial numbers of multi-address called stations are directly input from the operating unit 7, and all the digits of dial numbers are stored in the multi-address called station dial number memory 30. However, only codes indicating correspondence with dial numbers such as one-touch dial codes, abbreviated dial codes, or the like may be stored as data of multi-address called station dial numbers. In this case, a memory capacity necessary for the multi-address called station dial number memory 30 can be reduced.

The above embodiment has been described under the assumption that a telephone line is used. For other lines, the same control as described above can be made using selection numbers corresponding to the dial numbers, as a matter of course.

The present invention is not limited to the above embodiment, and various changes and modifications may be made within the spirit and scope of the invention.

What is claimed is:

1. A data communication apparatus comprising:
   receiving means for receiving data;
   memory means for storing address data of multi-address called stations in advance;
   sending means for sending the data received by said receiving means in a multi-address calling mode;
   means for receiving an instruction signal for instructing relay multi-address calling from a relay request station, and receiving address data of the relay request station; and
   control means for causing said sending means to perform multi-address calling to multi-address called stations using the address data stored in said memory means in response to reception of the relay instruction signal,
   wherein said control means, without receiving address data of multi-address called stations from the relay request station, transmits the received data to the multi-address called stations in accordance with the address data stored in said memory means, and
   wherein said control means discriminates the existence of the address data of the relay request station from among the address data stored in said memory means to inhibit sending-out the received data to the relay request station and thereby transmit the received data to the multi-address called stations exclusive of the relay request station.

2. An apparatus according to claim 1, wherein said receiving means includes data memory means for storing data, and stores the received data in said data memory means.

3. An apparatus according to claim 1, wherein said control means check for a relay instruction from the relay request station, and performs multi-address calling control if it is received.

4. An apparatus according to claim 1, wherein the address data is the dial number data.

5. An apparatus according to claim 4, wherein said control means discriminates whether or not the dial number data of the relay request station is included in the dial number data stored in said memory means.

6. A data communication apparatus comprising:
   receiving means for receiving data;
   memory means for prestoring identification data of multi-address called stations;
   sending means for sending received data to the multi-address called stations stored in said memory means in a multi-address calling mode;
   means for receiving the identification data of a relay request station and a relay multi-address calling instruction signal from the relay request station; and
   control means for controlling multi-address calling in response to the relay instruction signal,
   wherein said control means, without receiving identification data of multi-address called stations from the relay request station, transmits the received data to the multi-address called stations in accordance with the identification data of said memory means, and
   wherein said control means compares the identification data of the relay request station with the identification data in said memory means, and transmits the received data to the multi-address called stations exclusive of the relay request station, in accordance with the comparison result.

7. An apparatus according to claim 6, wherein when the identification data of the relay request station coincides with the identification data of a multi-address called station, said control means inhibits calling to the multi-address called station.

8. An apparatus according to claim 6, wherein the identification data is dial number data.

* * * * *

UNITED STATES PATENT AND TRADEMARK OFFICE
CERTIFICATE OF CORRECTION

PATENT NO. : 5,196,843
DATED : March 23, 1993
INVENTOR(S) : MOTOAKI YOSHINO

It is certified that error appears in the above-indentified patent and that said Letters Patent is hereby corrected as shown below:

COLUMN 2

Line 53, "ten to several ten" should read
        --ten or more--.

COLUMN 3

Line 1, "ten to several ten" should read
        --ten or more--.

Signed and Sealed this

Twenty-ninth Day of March, 1994

Attest:

BRUCE LEHMAN

Attesting Officer     Commissioner of Patents and Trademarks